Figure 1:
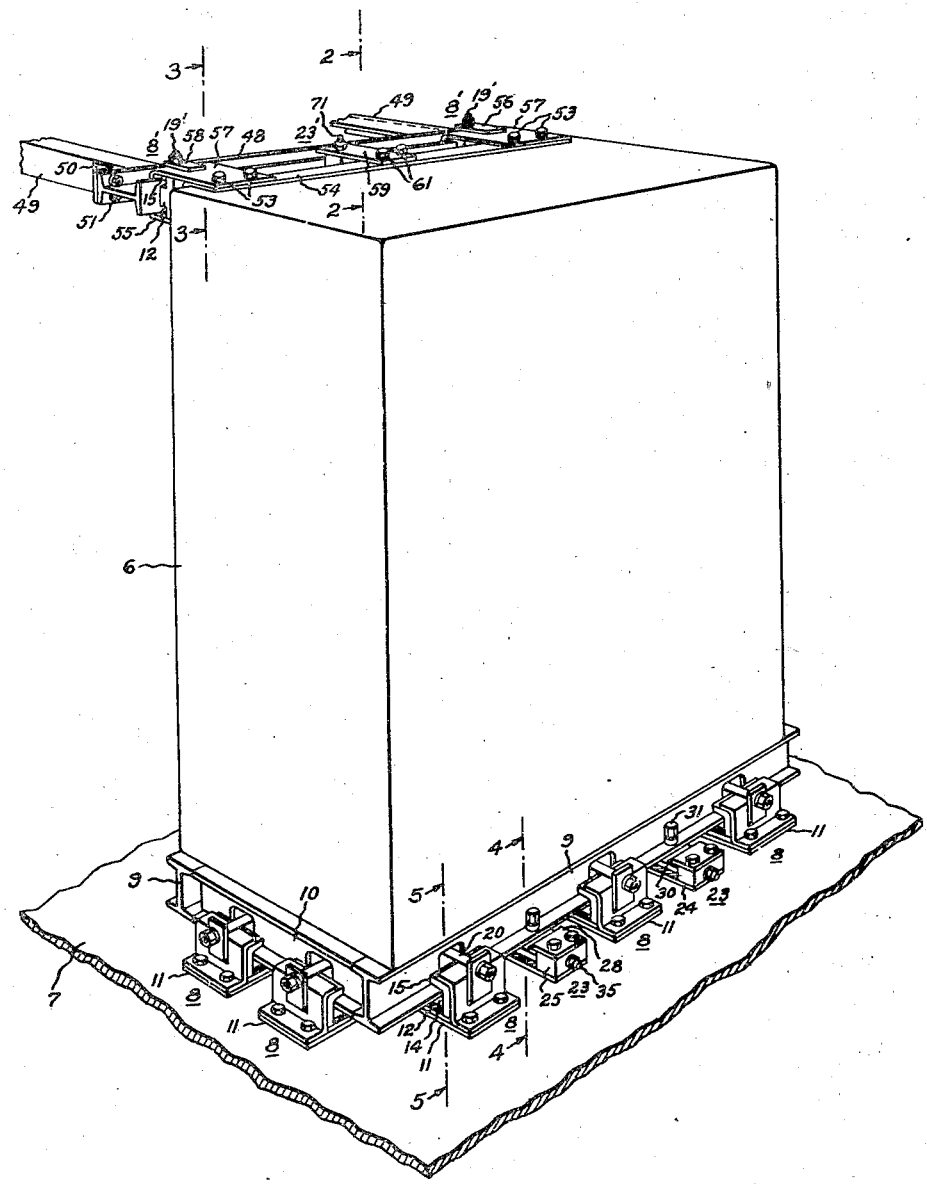

Dec. 17, 1946.       R. B. SHORES       2,412,838

SHOCKPROOF MOUNTING

Filed Jan. 6, 1944       3 Sheets-Sheet 1

Inventor:
Ronald B. Shores,
by Harry E. Dunham
His Attorney.

Dec. 17, 1946.    R. B. SHORES    2,412,838
SHOCKPROOF MOUNTING
Filed Jan. 6, 1944    3 Sheets-Sheet 2

Inventor:
Ronald B. Shores,
by *Harry E. Dunham*
His Attorney.

Patented Dec. 17, 1946

2,412,838

UNITED STATES PATENT OFFICE 2,412,838

SHOCKPROOF MOUNTING

Ronald B. Shores, Yeadon, Pa., assignor to General Electric Company, a corporation of New York Application January 6, 1944, Serial No. 517,265

11 Claims. (Cl. 248—22)

My invention relates to improvements in shock-proof mountings and more particularly shock-proof mountings for devices such as switchgear supporting structure, switchboards, and the like, for use where vibrations of differing frequencies are more or less normally present and where severe shocks may occur as, for example, on tanks and ships and especially warships.

For use on such vehicles, it has been customary to render certain critical apparatus, such as circuit breakers, relays, meters, and the like, as nearly shock-proof as possible against the explosive effects of mines, shells and the like, in order to avoid damage to the apparatus and to prevent false operations which could well prove crucial, especially under actual battle conditions. To build each piece of apparatus so that it is practically shock-proof is, however, burdensome from the standpoint of cost, manufacture, operation, and maintenance. Moreover, such individual shock-proofing materially complicates the structure. In order to avoid these disadvantages, it has been proposed to mount standard apparatus on a switchboard or like support which is itself so resiliently mounted as to be isolated from shocks without material injury to the apparatus and false operation thereof. But this immediately leads to difficulty because there are present in ships and tanks, for example, vibrations of so many differing frequencies that a resonant frequency of a resilient mounting or a frequency sufficiently close thereto is almost certain to occur. When such frequency or frequencies do occur, the switchgear support will be caused to vibrate relatively to the base structure. Such vibration not only produces unnecessary wear and tear on the supported apparatus but also tends to cause undesired operation. In short, the effects of such vibrations may be not only quite harmful to the apparatus but also almost as crucial as shocks.

An object of my invention is to provide a shock-proof mounting such as to eliminate the necessity for individual shock-proofing of each piece of apparatus supported by the mounting. Another object of my invention is to provide an improved apparatus mounting which is substantially nonresonant relatively to the base or supporting structure for such vibrations thereof as are likely to occur under other than shock conditions but which will so yield in response to shocks as substantially to prevent false operations of the apparatus as well as damage thereto. A further object of my invention is to provide a resilient shock-proof mounting which is normally rendered substantially rigid relatively to its base to maintain the mounting substantially nonresonant but which is restored to its resilient character under shock conditions above a predetermined level affecting the base. These and other objects of my invention will appear in more detail hereinafter.

In accordance with my invention, I render a resilient mounting substantially so rigid relatively to its base that it is incapable of vibrating relatively to the base for the usual vibrations to which the base is subjected and can respond. Further in accordance with my invention, when the base is subjected to shock conditions above a predetermined level, the rigidity effect is eliminated so that the resiliency of the mounting is free to isolate the shock effect without false operation or injury to the supported apparatus.

My invention will be better understood from the following description when considered in connection with the accompanying three sheets of drawings, and its scope will be pointed out in the appended claims.

Figure 2:
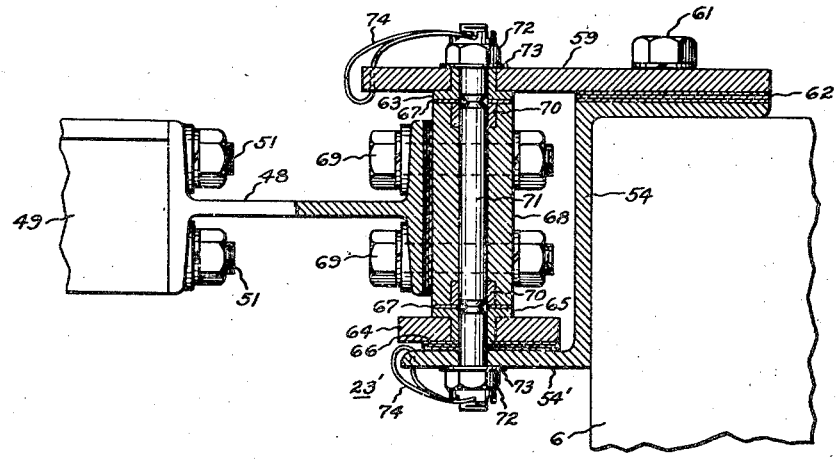
Figure 3:
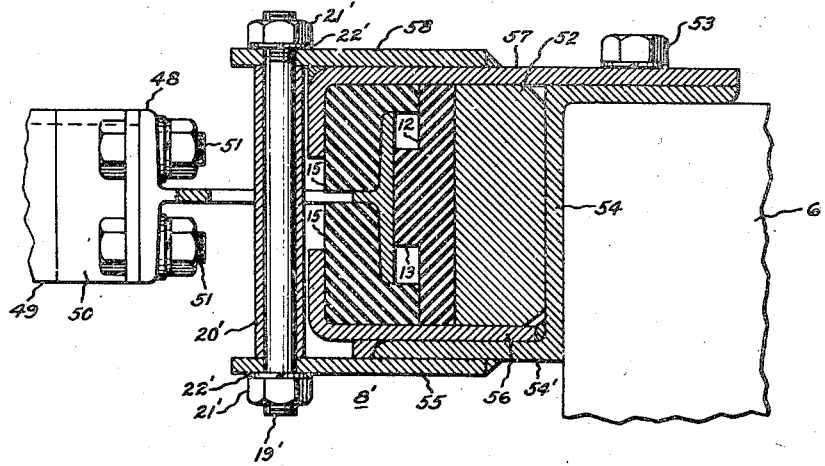
Figure 4:
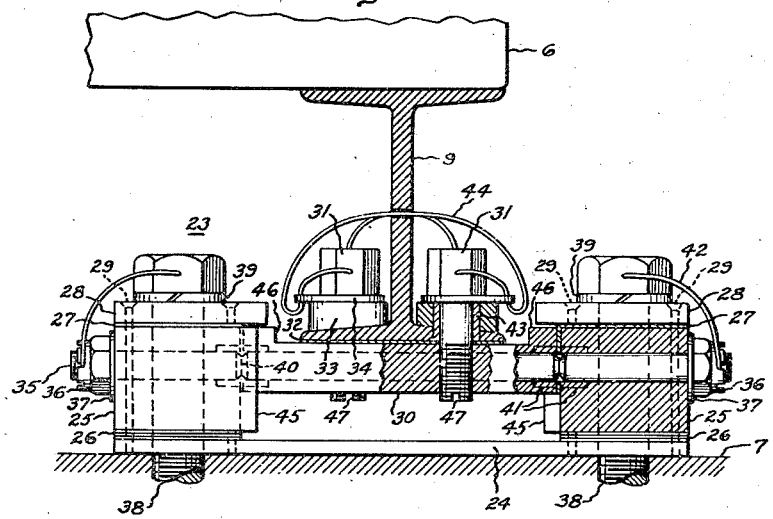

In the accompanying three sheets of drawings, Fig. 1 illustrates in perspective a shock-proof mounting, embodying my invention, arranged to support a device at the bottom and at one upper edge thereof; Fig. 2 is a sectional elevation on the line 2—2 of Fig. 1 illustrating an embodiment of my invention for stiffening a resilient mounting except under shock conditions above a predetermined level; Fig. 3 is a sectional elevation on the line 3—3 of Fig. 1 illustrating a form of resilient mounting as applied to the upper edge of the device shown in Fig. 1; Fig. 4 is a sectional elevation on the line 4—4 of Fig. 1 of another embodiment of my invention for stiffening a resilient mounting; and Fig. 5 is a sectional elevation on the line 5—5 of Fig. 1 illustrating a resilient mounting similar to that shown in Fig. 3 as applied at the bottom of the device shown in Fig. 1.

The accompanying drawings illustrate an embodiment of my invention in a shock-proof mounting for a device such as a box-like supporting structure 6. This structure, for the purpose of describing one application of my invention, may be considered to be a housing for so-called metal-clad switchgear, none of which is illustrated since it forms no part of my invention. It will be understood, however, that because of my invention the switchgear mounted in or on the device 6 may be of regular manufacture, that is, no special effort or construction is necessary to render it shock-proof apart from the mounting of the device 6 itself. The device 6 is supported on a base 7 such, for example, as a ship's deck which, as is well known, is subject, even under normal conditions, to vibrations of differing frequencies. On the basis of amplitude, these vibrations may be further classified as major and minor.

To isolate the device 6 from shocks and the like, it is supported from the base 7 by a resilient mounting which is substantially nonresonant at one or more frequencies of vibration of the base and preferably the major frequencies of vibration. As illustrated in Fig. 1, the mounting comprises a plurality of substantially similar resilient supports 8 along each lower side of the device 6 and between the base or deck 7 and a supporting frame for the device 6. As shown, this frame comprises a plurality of longitudinal and transverse structural members such as I-beams 9 and 10, respectively. There may also be intermediate structural members both transverse and longitudinal depending on the length and width of the device to be supported.

Figure 5:
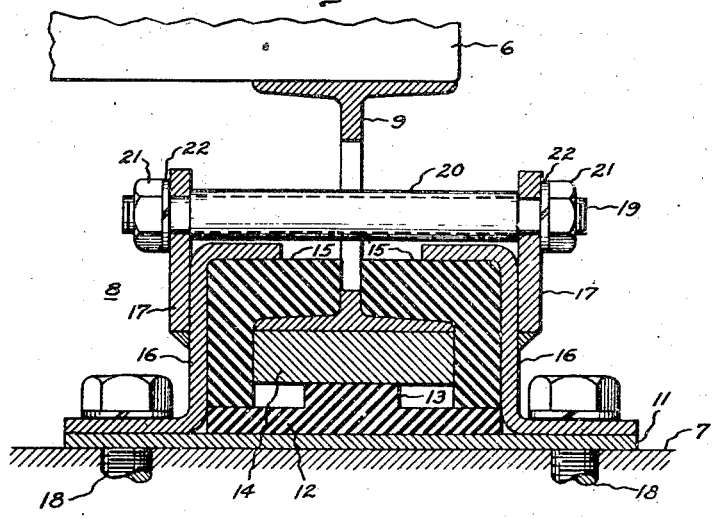

As illustrated more clearly in Fig. 5, each of the resilient supports 8 comprises a metallic base plate 11 and a resilient base pad 12 of rubber or the like having a raised central portion such as the flat ridge 13. Symmetrically positioned on this ridge 13 is a metallic block or pad 14 on which is seated the bottom side of the lower flange of the I-beam 9. Embracing the top side of the lower flange of the I-beam 9, a portion of the web thereof and the sides of the pad 14 are angularly shaped resilient pads 15 of rubber or the like. These pads 15 also engage the upper face of the thinner portions of the resilient base pad 12. The pad assembly is held in place on the base 7 and around the lower flange of the I-beam 9 by brackets which, as shown, comprise a Z-bar section 16 and a flat plate 17 secured thereto as by welding. These brackets are secured to the base or deck structure by suitable fastening means such as cap screws or bolts 18 which pass through the base plate 11. At the top, the brackets are secured to each other by suitable fastening means such as a threaded pin 19 passing through the bracket plates 17 and a suitable clearance hole in the web of the I-beam 9 and provided with a spacer 20, nuts 21, and lock washers 22. The construction and arrangement of the parts is such that when the assembly of the resilient mounting 8 is completed, the rubber pads 12 and 15 are under such compressive stresses and loads as to render the mounting nonresonant at the desired frequency or frequencies. Factors determining the non-resonant condition are the loaded area of the rubber pads 12 and 15, the free area thereof, the character of the rubber and the magnitude of the load.

Inasmuch, however, as the resilient mounting just described is liable to resonance at some other frequency or frequencies of vibration of the base 7 such that the device 6 can vibrate relatively to the base, I provide stiffening means for preventing such relative vibrations since they can cause damage to supported apparatus and even cause false operation thereof. In accordance with my invention, this means effectively renders the mounting of the device 6 substantially rigid relatively to the base 7. However, since this relative rigidity would be dangerous in case of shocks, I so construct and arrange my anti-vibration or stiffening means as to fail on application to the base 7 of a shock above a predetermined level or, in other words, to restore the mounting to its resilient or shock isolating condition.

As illustrated in Fig. 1, this stiffening means comprises one or more units 23 which are mounted at the bottom of the device 6 intermediate the resilient supports 8 along the I-beams 9. Each of these stiffening units, as shown more clearly in Fig. 4, comprises a base plate 24 and two blocks 25 mounted adjacent the ends of the base plate and spaced therefrom by one or more shims 26. Above each of the end blocks 25 is an angler shim 27 and a top plate 28. Each end block 25 and the parts respectively associated therewith are secured to the base plate 24 by suitable means such as screws 29. Between the end blocks 25 is a block 30 which is secured to the lower face of the bottom flange of the I-beam 9 by cap screws 31 with an intervening shim 32. Each cap screw 31 passes through a spacer and leveling block 33 and a washer 34. The base plate mounting is secured to the device 6 by a pin 35 which passes through the end blocks 25 and the intermediate block 30. This pin 35 is held in place by nuts 36 over lock washers 37.

In the assembly of the supporting structure, the device 6 is mounted on the resilient supports 8 which take the load. Then the stiffening supports 23 are assembled on the device frame and brought to an even bearing by the shims 26. The base plate mounting comprising the base plate 24 and the blocks 25 and 30 is then secured to the supporting base or deck 7 by suitable fastening means such as bolts 38 provided with lock washers 39. The device 6 is now so rigidly mounted relatively to the base 7 that it cannot vibrate relatively thereto. Consequently the device 6 is no longer isolated from shock.

In order to isolate the device 6 from shock, the rigid or stiffening support 23 is so constructed and arranged as to fail under stresses produced therein on application to the base of a shock above a predetermined level. Thus, in the anti-vibration or stiffening mounting 23, shown in Fig. 4, the pin 35 and the cap screws 31 are designed to fail under predetermined shearing stresses whereby to free the device 6 of restraint from the mountings 23, thus, for example, the pin 35 may be made of suitable material, such as brass, with reduced cross sectional areas 40 where the pin 35 leaves the intermediate block 30. In order to ensure a clean rupture of the shearing pin 35 without damage to the blocks 25 and 30, these are provided with hardened steel bushings 41, the adjacent edges of which are sharp-cornered to effect a clean shearing action. The downturned or vertical flange of the spacer shim 27 between the blocks 25 and the block 30 provides suitable clearance space for the desired shearing action. The shim 27, as also the shims 26, may be of copper.

Since under shock the outer sheared end portions of the pin 35 might tend to become flying projectiles which could injure personnel and equipment, I provide suitable restraining means to prevent such action. Thus, for example, these outer end portions may be fastened to the heads of the bolts 38 by suitable means, such as wire loops 42. The cap screws 31 may also be of brass and designed to shear under transverse stresses due to shocks above a predetermined level. As shown, each of these cap screws passes through a bushing 43 into threaded engagement with the block 30. The bushing 43 functions in the same manner for the cap screws 31 as the bushings 41 do for the pin 35. Also, the shim 32, which may be of copper, provides the necessary clearance space for the desired shearing action. Since the cap screws 31 have their lower portions threaded into the intermediate block 30, there is little likelihood that the lower or threaded portions of these cap screws can become detached in case the cap screw is sheared. However, the upper portions are free to fly out of their bushings under shock. In order to prevent this, as well as the projectile action of the washers 34, the heads of the cap screws and the washers 43 may be secured to the web of the I-beam by a wire loop 44.

It will be observed that, for any shock which would produce shearing forces sufficient to rupture the pin 35 and each of the cap screws 31, the intermediate block 30 would be free to move about under the shock impulse. This would, of course, produce another projectile hazard. In order to prevent this, each of the end blocks 25 is provided with two vertical flanges 45 which restrict the movement of the block 30 in a direction at right angles to the plane of the drawings. In order to restrain the movement of the block 30 in a vertical direction, the top plates 28 overlap the end blocks 25 on the inside so as to engage projections 46 on the intermediate block 30 in case the shearing pin 35 is broken. There is sufficient clearance between the top plate 28 and the projections 46 to in general ensure the rupture of the pin 35 in the event of a shock causing the device 6 to move upwardly.

If the shock impulse were such that the device 6 tended to continue to move vertically after the shearing pin 35 ruptured, then the cap screws 31 would fail in tension to cooperate in isolating the shock. Thus, under any shock condition, such as to effect a rupture of the shearing pin 35 or the cap screws 31 or both, the rigid or stiffening effect of the support 23 is eliminated to permit the resilient mountings 8 to isolate the device 6 from shock. Following a shock which has ruptured either the shearing pin 35 or the cap screws 31, these may be replaced by spares to restore the device to the initial condition. In order to facilitate this work, the cap screws 31 are made long enough so that a slot 47 therein projects below the intermediate block 30 sufficiently to be removed by an angle-type screw driver.

In order further to isolate the device 6 against shock, there may be provided between the device and a bulkhead, not shown, of the ship, additional resilient mounting means 8', which are interposed between the device 6 and the ship's bulkhead through a longitudinal structural member such as an I-beam 48 and transverse braces 49. As shown, the braces 49 are in the form of angles which are more or less flexible in a vertical plane for reasons hereinafter to appear. The braces 49 are secured to the I-beam 48 by any suitable means such as an angle bar 50 welded to the braces and bolts 51.

The mounting means 8' is essentially like the mounting means 8 in that it comprises a resilient pad 12 on one side of one flange of the I-beam 48 and two angularly shaped resilient pads 15 embracing the inner face of the one flange and a portion of the web of the I-beam. The difference between the two mountings is that the steel pad 14 of the mounting 8' is omitted so that the flange of the I-beam 48 rests directly on the projection 13 of the pad 12. This pad is backed up by a spacer block 52 of suitable material which may be metal but, since it does not have to support the weight of the device 6 and its associated apparatus, may be of other material such, for example, as laminated sheet material.

The pad assembly is held in place on the device 6 and around the flange of the I-beam 48 by two brackets suitably secured to the device 6 as by bolts 53. The lower bracket includes the outstanding leg 54' of a longitudinal edge stiffening member such as a Z-bar 54. To this outstanding leg 54', there is suitably secured, as by welding, on the outside a plate 55 and on the inside an angle bar 56. The upper bracket comprises an angle bar 57 to the longer leg of which is secured on the outside, as by welding, a plate 58. At their free extremities, the brackets are secured to each other by suitable fastening means such as a threaded pin 19' passing through the bracket plates 55 and 58 and a suitable clearance hole in the web of the I-beam 48 and provided with a spacer 20', nuts 21', and lock washers 22'. The construction and arrangement of the parts is such that when the assembly of the resilient mounting 8' is completed the rubber pads 12 and 15 are under such compressive and load stresses as to render the mounting nonresonant at the desired frequency or frequencies.

Again, however, the resilient mounting 8' just described is liable to resonance at some other frequency or frequencies of vibration of the ship's structure. Consequently, the device 6 may vibrate relatively to the base 7. In order further to stiffen the device 6 against vibrations, I provide one or more stiffening means 23', located at the upper supported edge of the device intermediate the mounting means 8', as shown in Fig. 1 and more clearly in structural details in Fig. 2. This stiffening means 23' further tends effectively to render the mounting of the device 6 substantially rigid relatively to the base. Again, however, since this relative rigidity would be dangerous in case of shocks, I so construct and arrange the stiffening means 23' as to fail on application to the ship's structure of a shock above a predetermined level so as to restore the mounting of the device 6 to its resilient or shock isolating condition.

As shown in Fig. 2, this stiffening unit comprises an upper bracket in the form of a flat plate 59 and a lower bracket embodying the Z-bar 54, both of which are secured to the device 6 by suitable fastening means such as bolts 61 with intervening shims 62. Supported in the upper bracket 59 is a flanged bushing 63 and on the lower bracket 54' a block 64 carrying a flanged bushing 65 and spaced from the bracket by suitable shims 66. Between the bushings 63 and 65 and separated therefrom by suitable spacer shims 67 is a block 68 which is suitably secured to the one flange of the I-beam 48 as by bolts 69. The spacer block 68 is provided at its ends with bushings 70. Passing through the upper bracket 59, the bushing 63, the upper spaced shim 67, the upper bushing 70, the block 68, the lower bushing 70, the lower shim 67, the bushing 65, the plate 64, the shims 66, and the lower bracket 60 is a shearing pin 71 whose cross section is materially reduced adjacent the shims 67 so as to fail under shearing stresses which would occur with shocks above a predetermined level. The shearing pin 71 is held in place in the brackets by suitable means such as nuts 72 and lock washers 73.

As in the assembly of the stiffening means 23 at the base of the device 6, the stiffening means 23' is not set up until after the resilient mountings 8' have been assembled. After these have been taken care of, then the stiffening means 23' are assembled with the use of whatever shims 62 and 66 are necessary to bring the shearing pin to an even bearing for proper stiffening support of the device 6 at its upper edge. Thus, with the resilient mountings 8 and 8' and the stiffening or anti-vibration mountings 23 and 23', the device 6 is so rigidly mounted to the base 7 and the bulkheads associated therewith that the device cannot vibrate relatively thereto. The device 6 is therefore not isolated from shock.

On the occurrence of any shock which so transversely loads the shearing pin 71 as to effect the rupture thereof especially at its reduced cross sectional areas, the upper edge of the device 6 is restored to its shock isolating condition. Inasmuch as the outer end portions of the shearing pin 71, together with their associated nuts 72, might be thrown out under shock conditions and thus become projectiles dangerous to personnel and equipment, I lock these end portions to their respective frames by suitable means such as a wire loop 74. As shown in Fig. 2, the shearing pin 71 would not tend to rupture under shocks causing vertical forces. Under these conditions, the flexibility of the braces 49 in the vertical plane will permit a certain amount of movement in this plane following the rupture of the shearing pins in the stiffening supports 23 at the base of the device 6.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a base, a device to be supported thereby, means for substantially rigidly supporting said device from said base rupturable on application to the base of a shock above a predetermined level, and means for resiliently supporting said device from said base following rupture of said rigidly supporting means.

2. In combination, a base, a device to be supported thereby, means for substantially rigidly supporting said device from said base comprising a member rupturable under stresses produced therein on application to the base of a shock above a predetermined level and means for resiliently supporting said device from said base following rupture of said member.

3. In combination, a base, a device to be supported thereby, means for substantially rigidly supporting said device from said base comprising a plurality of rigid supports interconnecting said device and said base, each of said rigid supports comprising a member rupturable on application to the base of a shock above a predetermined level and a plurality of resilient mountings interconnecting said device and said base for resiliently supporting the device from the base following rupture of said rigid supports.

4. In combination, a base, a device to be supported thereby, a resilient mounting for supporting said device from said base, and means for effectively rendering the mounting of said device substantially rigid relatively to said base comprising a shearing pin designed to break under shearing stresses produced therein on application to the base of a shock above a predetermined level.

5. In combination, a base, a device to be supported thereby, a resilient mounting for supporting said device from said base, and means for effectively rendering the mounting of said device substantially rigid relatively to said base comprising two members mounted at a predetermined angle to each other, each of said members being rupturable under stresses produced therein on application to the base of a shock above a predetermined level.

6. In combination, a base, a device to be supported thereby, a resilient mounting for supporting said device from said base, and means for effectively rendering the mounting of said device substantially rigid relatively to said base comprising two shearing pins mounted at right angles to each other, each of said pins being designed to fail under shearing stresses produced therein on application to the base of a shock above a predetermined level.

7. In combination, a base subject to vibrations of differing frequencies, a device to be supported thereby, a resilient mounting for supporting said device from said base substantially nonresonant at one frequency of vibration of the base and subject to excessive vibration at another frequency of vibration of the base, and means for preventing vibrations of said device relatively to the base at said other vibration frequency comprising a shearing pin designed to break under shearing stresses produced therein on application to the base of a shock above a predetermined level.

8. In combination, a base subject to vibrations of differing frequencies, a device to be supported thereby, a resilient mounting for supporting said device from said base substantially nonresonant at one frequency of vibration of the base and subject to excessive vibration at another frequency of vibration of the base, and means for preventing vibrations of said device relatively to the base at said other vibration frequency comprising two shearing pins mounted at right angles to each other, each of said pins being designed to fail under shearing stresses produced therein on application to the base of a shock above a predetermined level.

9. In combination, a base subject to vibrations of differing frequencies, a device to be supported thereby, a resilient mounting for supporting said device from said base substantially nonresonant at one frequency of vibration of the base and subject to excessive vibration at another frequency of vibration of the base, and means for preventing vibrations of said device relatively to the base at said other vibration frequency comprising two members mounted at a predetermined angle to each other, each of said members being rupturable under transverse loading stresses produced therein on application to the base of a shock above a predetermined level.

10. In combination, a base subject to vibrations of differing frequencies, a device to be supported thereby, supporting means for said device for preventing vibration thereof relatively to the base rupturable on application to the base of a shock above a predetermined level, and means for supporting said device from said base following rupture of said supporting means comprising a resilient mounting substantially nonresonant at a predetermined frequency of vibration of the base and subject to excessive vibration at another frequency of vibration of the base.

11. In combination, a base subject to vibrations of differing frequencies, a device to be supported thereby, supporting means for said device for preventing vibration thereof relatively to the base comprising a member rupturable under stresses produced therein on application to the base of a shock above a predetermined level, and means for supporting said device from said base following rupture of said supporting means comprising a resilient mounting substantially nonresonant at a predetermined frequency of vibration of the base and subject to excessive vibration at another frequency of vibration of the base.

RONALD B. SHORES.